United States Patent [19]

Tu et al.

[11] Patent Number: 5,504,408
[45] Date of Patent: Apr. 2, 1996

[54] METHOD OF FEEDING A SINGLE-PHASE STEPPING MOTOR

[75] Inventors: Mai X. Tu; Michel Schwab, both of Biel-Bienne, Switzerland

[73] Assignee: Detra SA, Switzerland

[21] Appl. No.: 395,885

[22] Filed: Feb. 28, 1995

[30] Foreign Application Priority Data

Mar. 17, 1994 [EP] European Pat. Off. .............. 94810167

[51] Int. Cl.⁶ ..................................................... G05B 19/40
[52] U.S. Cl. .............................................. 318/685; 368/217
[58] Field of Search ...................................... 318/685, 696; 358/157, 217–219

[56] References Cited

U.S. PATENT DOCUMENTS

| | | | |
|---|---|---|---|
| 4,361,410 | 11/1982 | Nakajima et al. | 368/157 |
| 4,542,329 | 11/1985 | Tu Xuan | 318/696 |
| 5,166,590 | 11/1992 | Tu et al. | 318/685 |
| 5,247,235 | 9/1993 | Tu et al. . | |
| 5,294,877 | 3/1994 | Cameron | 318/809 |

FOREIGN PATENT DOCUMENTS 2076566  12/1981  United Kingdom .

*Primary Examiner*—Brian Sircus
*Attorney, Agent, or Firm*—Oliff & Berridge

[57] ABSTRACT

The method is designed to supply the motor with chopped voltage pulses of varying durations as a function of the load conditions and of the supply voltage. The chopped voltage pulse is composed of a plurality of partial pulses of predetermined durations T1, T2, and T3. The feeding circuit comprises a detector of a condition of extreme load defined by k1·T4<k2·T5, wherein k1 and k2 are constants, T4 is an interval separating T1 and T2, and T5 is an interval separating T2 and the first pulse T3.

9 Claims, 7 Drawing Sheets

FIG. 3a
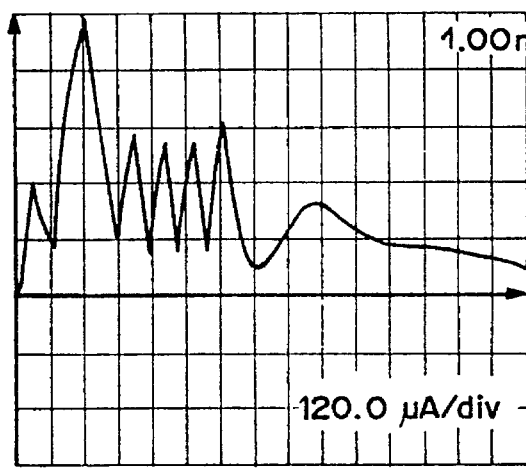
FIG. 3b
FIG. 3c
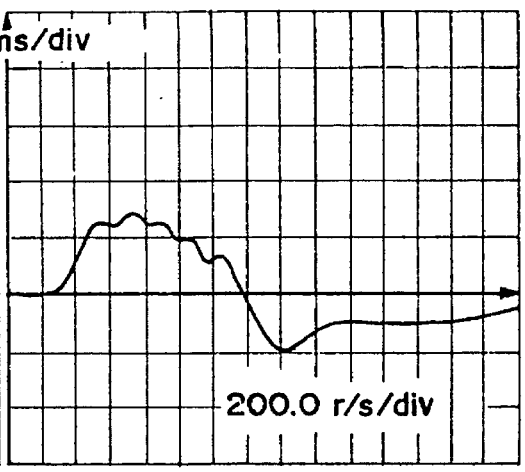
FIG. 3d 0.5 V/div
1.00 ms/div

Reinforcing pulses

T7 — 30 ms — 30 ms

METHOD OF FEEDING A SINGLE-PHASE STEPPING MOTOR

This invention relates to stepping motors, and more particularly to a method of feeding a single-phase stepping motor for a timepiece, of the type adapted to supply the motor with chopped voltage pulses of a duration variable as a function of the load conditions and the supply voltage, and reinforcing pulses succeeding the variable-duration pulse. The invention further relates to a circuit for driving a single-phase stepping motor for carrying out the foregoing method, of the type having an assembly of switches, time-counting means determining main periods succeeding one another at a constant frequency, and control means acting on the switches for supplying the motor during each main period with a chopped pulse formed of a plurality of partial pulses and reinforcing pulses under extreme load conditions, these means including one or more sensors capable of determining the duration of the partial pulses.

Most of the circuits for feeding quartz watch motors supply the coil of the motor with a voltage pulse of constant duration and amplitude. This mode of feeding has the drawback of too high power consumption and, consequently, reduction of the life of the battery. A number of solutions have been proposed with a view to reducing the power consumption of the motor by supplying it with a feed pulse varying as a function of its mechanical load.

U.S. Pat. No. 5,247,235 discloses a method of feeding a single-phase stepping motor in which the motor is supplied with a train of pulses of the same polarity and constant duration T4, separated by intervals of time T5i varying as function of the load conditions and as a function of the supply voltage, each interval T5i being bounded by the end of a partial pulse Ty and the moment following this end when the current of the coil is equal to or less than a reference value Iref.

Although the foregoing method has the advantage of simplicity of implementation of the logical control circuit, it presents two major drawbacks. Firstly, in order for the method to operate correctly, the reference current Iref must be fairly precise within a fairly wide range of voltage and temperature. Although such precision may be achieved technically, it nonetheless makes the circuit more expensive. Secondly, in the event of extreme perturbation, e.g., a severe jolt, the motor may miss steps.

It is an object of this invention to provide an improved method of feeding a single-phase stepping motor which remedies the aforementioned drawbacks may be remedied.

A further object of this invention is to provide such a feeding method which ensures a saving on the power consumed by the motor as compared with prior art methods.

To this end, in the method according to the present invention, of the type initially mentioned, each chopped voltage pulse is formed of a train of partial voltage pulses composed of a pulse of a duration T1, a pulse of a duration T2, and a train of pulses of a constant duration T3, the pulses of durations T1, T2, T3 being of the same polarity; the intervals of time T4, T5, and T6 separating the partial voltage pulses are variable as a function of the load conditions and as a function of the supply voltage of the motor; and the reinforcing pulses are supplied to the motor only when the extreme load condition defined by $k1 \cdot T4 < k2 \cdot T5$ appears, k1 and k2 being predetermined constants.

In the driving circuit according to the present invention, also of the type initially mentioned, the counting means are arranged to define constant durations delimiting the partial pulses, and the control means include a sensor reacting to the intervals of time T4, T5, and T6i for delimiting the total duration of the chopped pulse and a sensor reacting to the intervals of time T4 and T5 for supplying the motor with the reinforcing pulses.

A preferred embodiment of the invention will now be described in detail with reference to the accompanying drawings, in which:

FIGS. 3a to 3d are a group of graphs showing the current, the voltage, the angular velocity, and the angle of rotation of the rotor of a stepping motor fed according to the inventive method, the motor being loaded by a substantial torque;

Figure 5A:
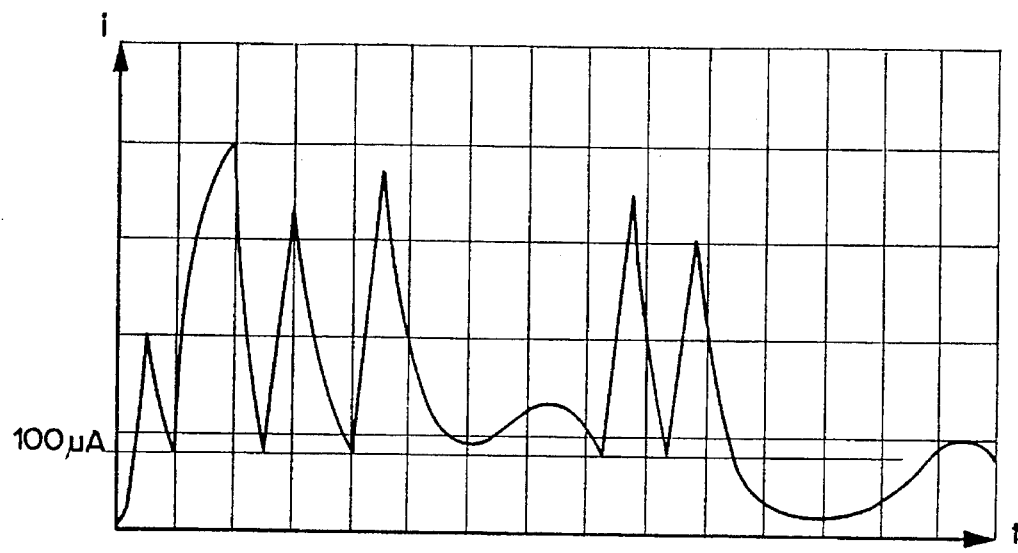
Figure 5B:
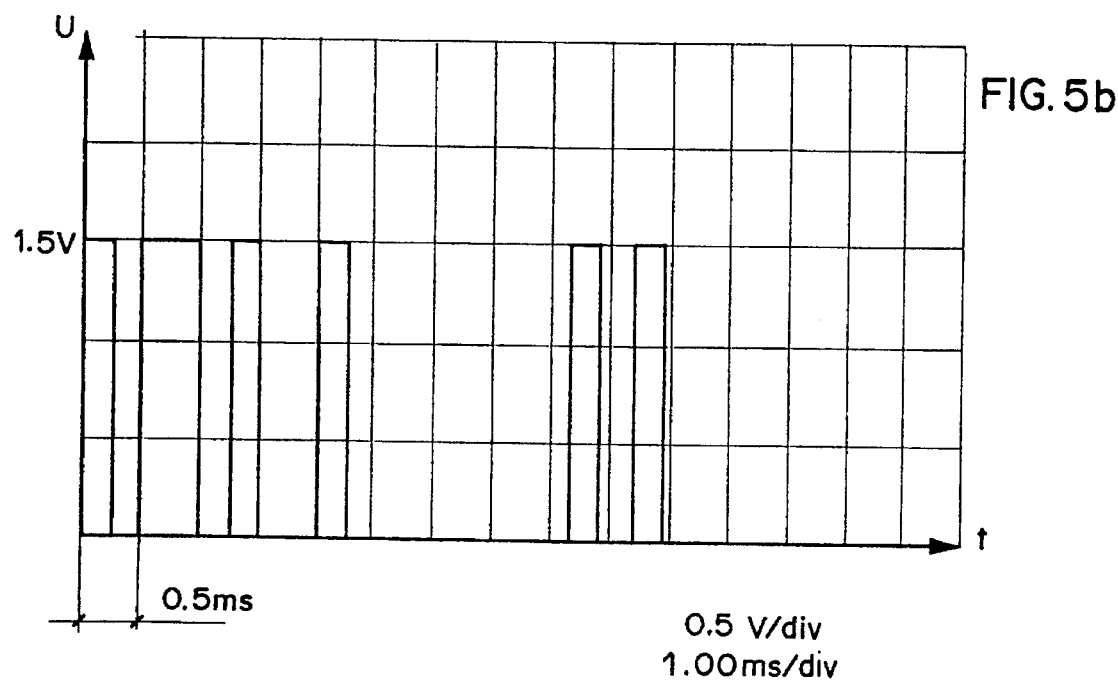
Figure 6:
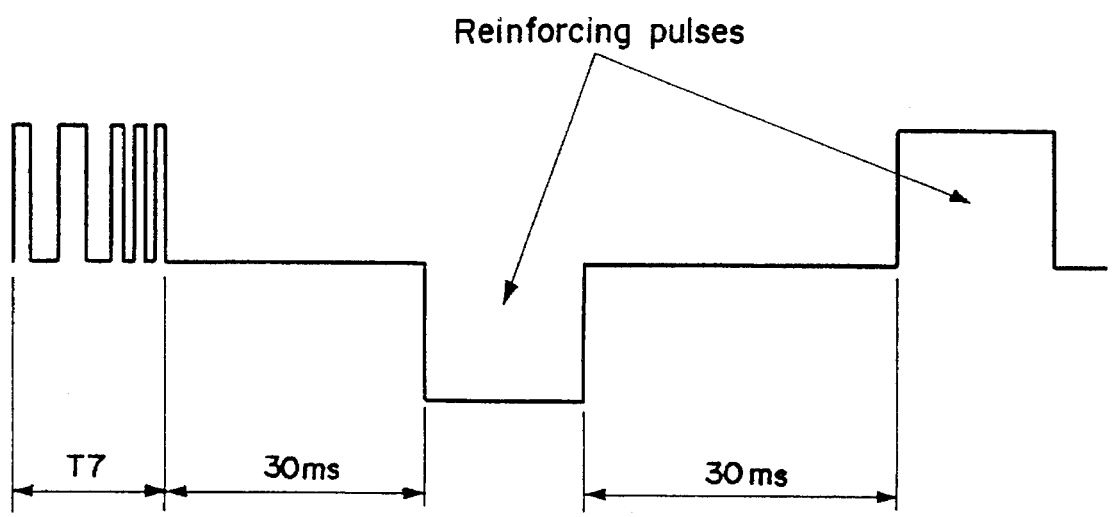
Figure 8:
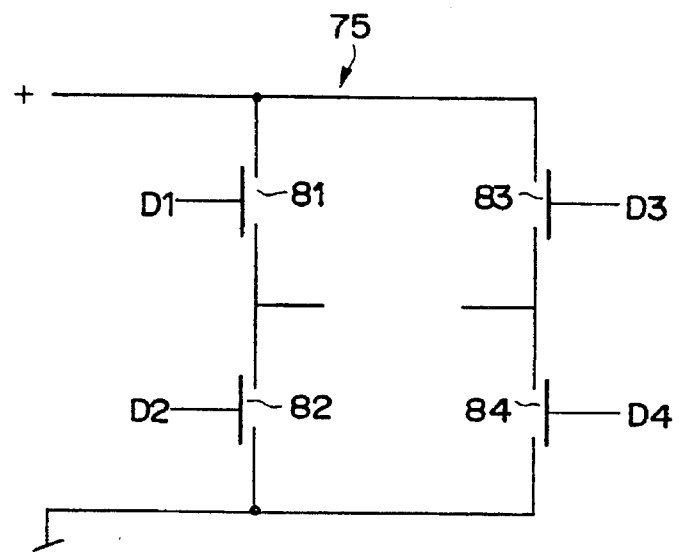
Figure 7:
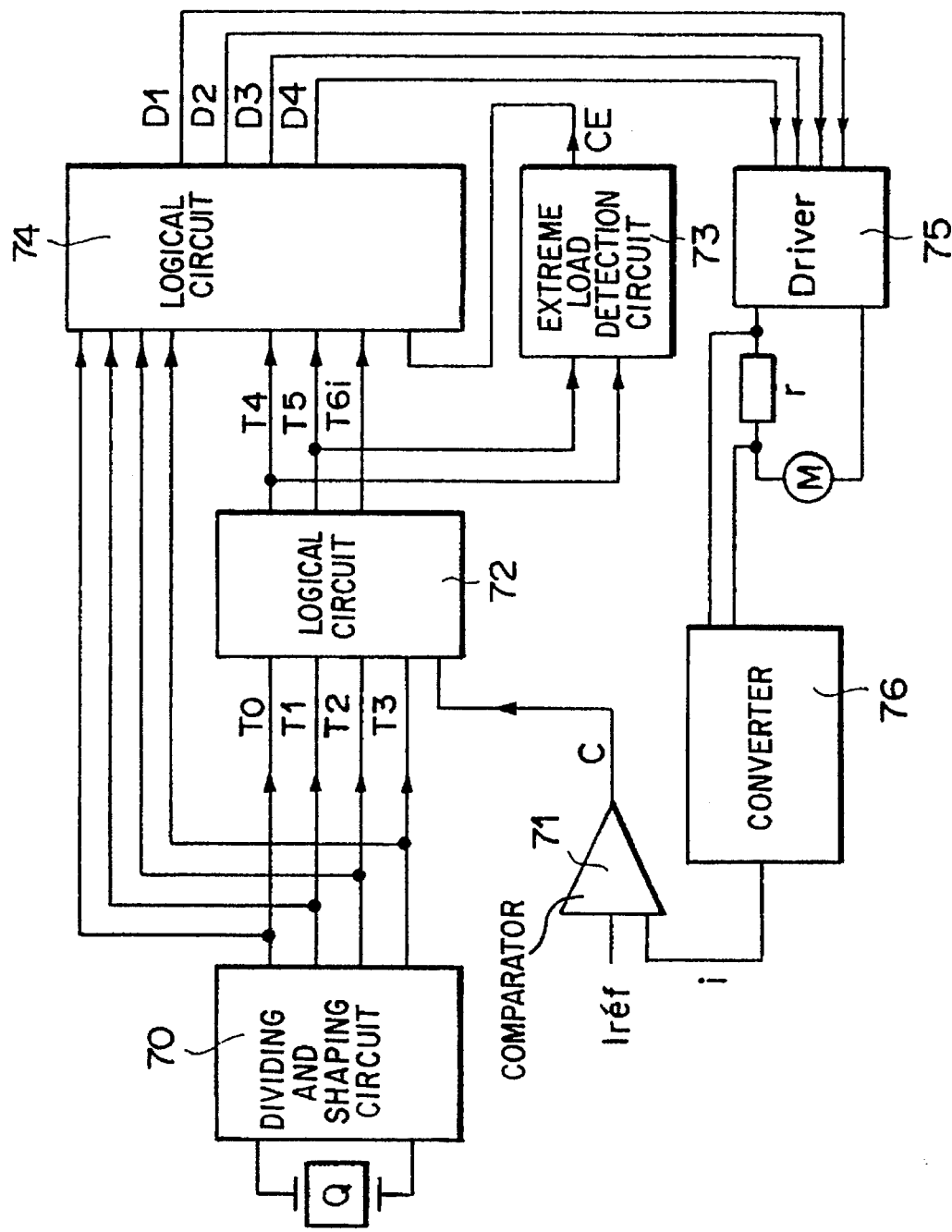

FIG. 5 comprises two graphs showing the current and voltage of the motor when the polarity of the pulse is different from that of the rotor;

FIG. 6 is a diagram showing the reinforcing pulses;

FIG. 7 is a diagram illustrating an embodiment of the circuit for carrying out the inventive feeding method; and FIG. 8 is a detail of a driver appearing in FIG. 7.

The graphs in FIG. 1 show the current, the voltage, the angular velocity, and the angle of rotation, respectively, of the rotor of a single-phase stepping motor fed according to the inventive method, with the motor idling, i.e., without mechanical torque. In this case, the angular velocity of the motor is rather high (about 600 rad/s), and the motor makes its step from 0° to 180° after about 15 ms.

Figure 1A:
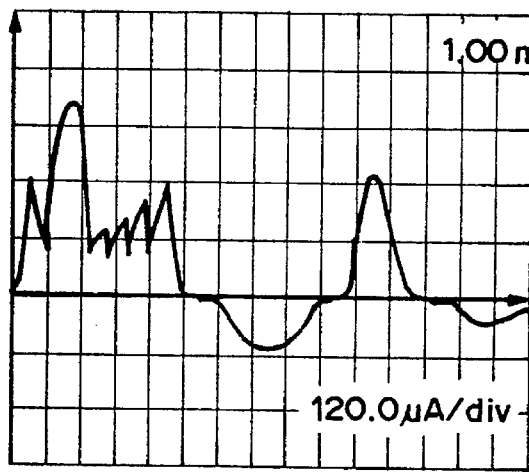
FIGS. 1a to 1d are a group of graphs showing the current, the voltage, the angular velocity, and the angle of rotation of the rotor of a stepping motor fed according to the inventive method, the motor not being loaded.
Figure 1B:
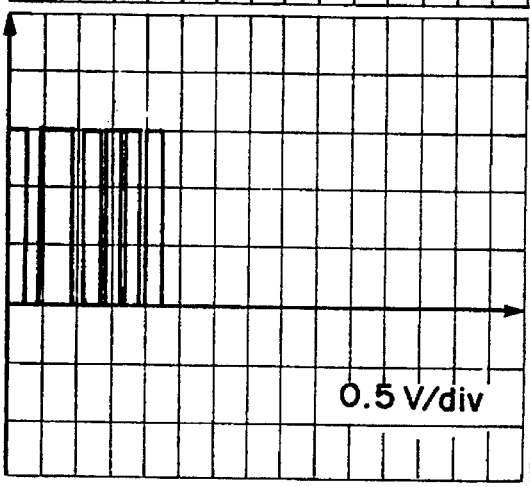
Figure 1C:
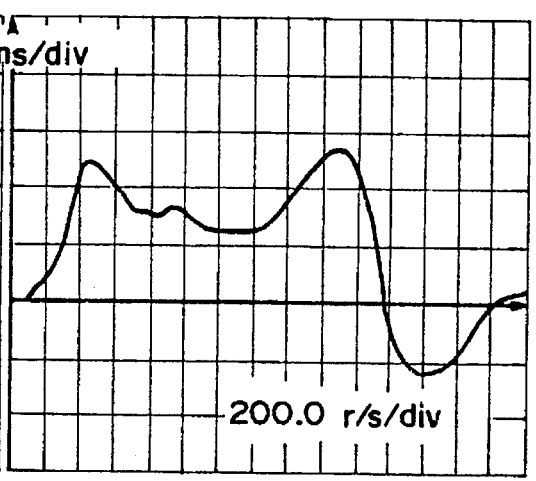
Figure 1D:
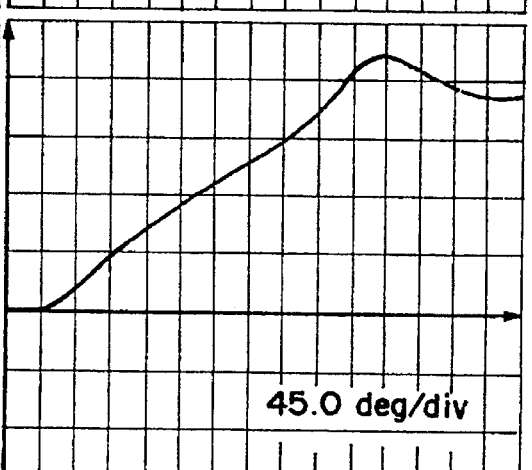
Figure 2A:
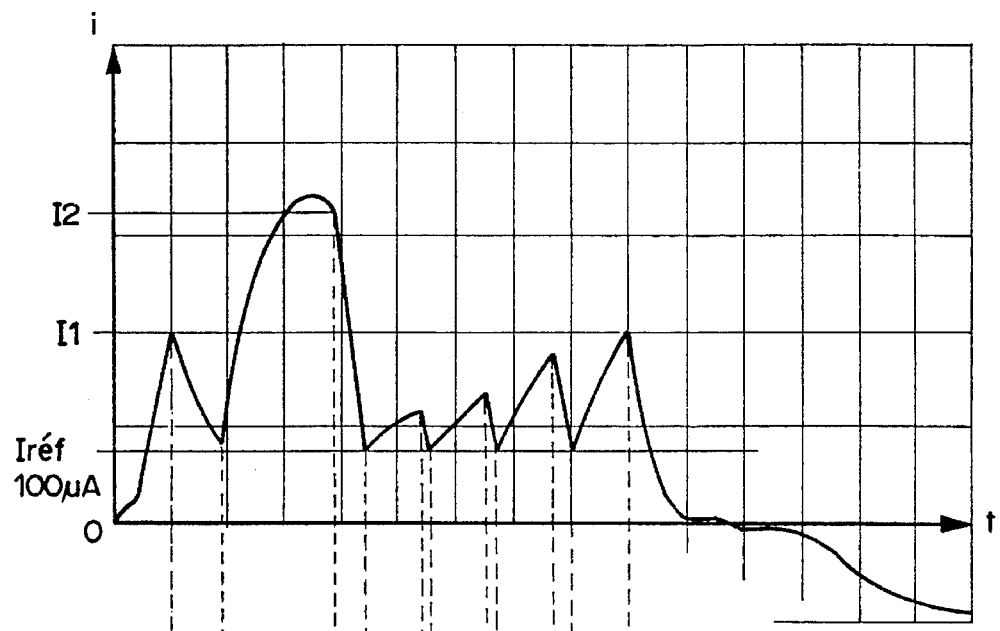
FIGS. 2a and 2b represent enlargements from the first two graphs in FIG. 1.
Figure 2B:
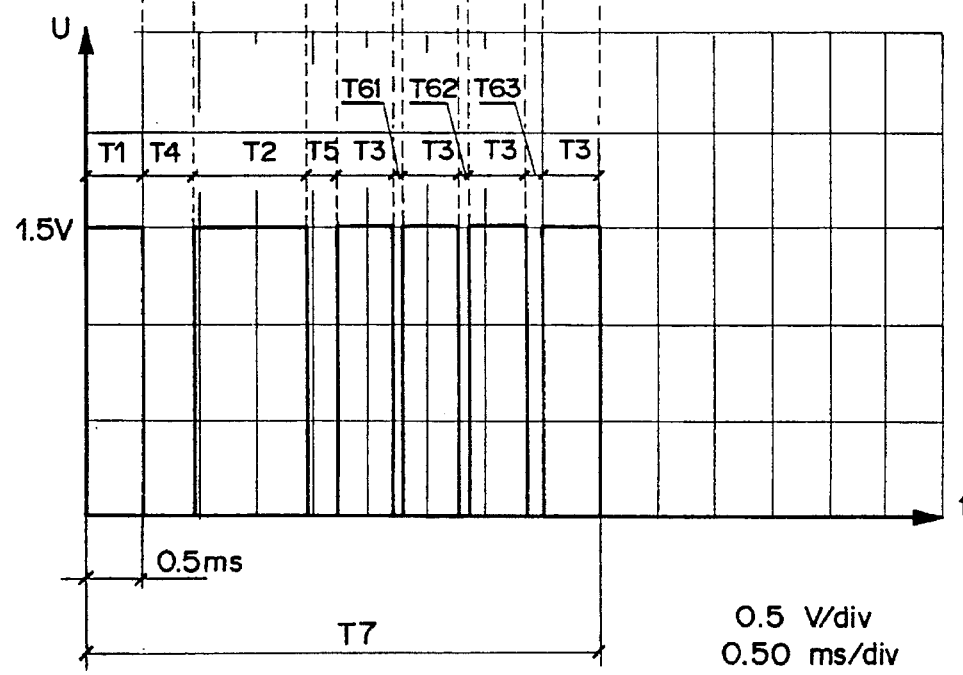

As seen in FIG. 2, the chopped voltage pulse of duration T7 is formed by a train of partial pulses of predetermined durations T1, T2, and T3. In this example, T1= 0.5 ms, T2=1 ms, and T3=0.5 ms. These partial pulses are separated by intervals T4, T5, and T6i (i=1 to 3).

The succession of partial pulses takes place as follows: initially, the motor is fed by a pulse of constant voltage of duration T1; the current in the coil increases from zero to the value I1. After this duration T1, the coil of the motor is short-circuited. The current in the coil decreases starting from the time t=T1 from the value I1 to a reference value Iref. From that moment on, i.e., the moment t=T1+T4, the coil is again fed by a constant voltage of duration T2. The current in the coil increases from Iref to I2. At the moment t=T1+T4+T2, the coil is short-circuited. The current decreases from I2 to Iref at the moment t=T1+T4+T2+T5. From that moment on, the feeding process is repeated with a constant feed duration T3, the intervals of time separating the partial pulses of duration T3 being called T6i. The feeding process is interrupted when one of the following conditions appears:

the number of partial pulses of duration T3 reaches a limit, the limit being set at 4 in this example;

one of the intervals T6i exceeds a limit; in this example, the limit set at 2 ms is not reached;

the total duration T7 of the pulse exceeds a limit; in this example, the limit set a 12 ms is not reached.

The total duration of the pulse T7 according to the inventive feeding method is expressed by $$T7 = T1 + T2 + k \cdot T3 + T4 + T5 + \sum_{i=1}^{k-1} T6i$$

wherein k=4 in this example.

It will be seen that the total duration is equal to a predetermined constant value (T1+T2+k·T3) and a duration varying according to the load conditions of the motor, viz., $$T4 + T5 + \sum_{i=1}^{k-1} T6i$$

The greater the load on the motor, the greater is this varying duration. The durations T4, T5, and T6i are, in fact, determined by the time of decrease of the current in the coil when the latter is short-circuited. This decrease is defined by the voltage equation of the motor, $$0 = Ri + L \, di/dt + k\Omega \quad (1)$$

or $$di/dt = -(Ri + k\Omega)L \quad (2)$$

wherein L=inductance of the motor, R=resistance of the motor, i=current, t=time, k=coefficient of coupling expressing the variation in mutual flux between the magnet and the coil, and $\Omega$=angular velocity.

When the load on the motor is substantial, the speed of rotation is decreased, thus bringing about a less rapid decrease of the current and, consequently, an augmentation of the decrease time.

Thus, the inventive feed makes it possible to supply the motor with a pulse duration adapting to the mechanical load.

This adaptation ensures good operation of the motor under normal load conditions. Under extreme load conditions, e.g., when high-amplitude shocks occur, the pulse of duration T7 can no longer ensure the step of the motor.

The graphs in FIG. 3 show the current, voltage, angular velocity, and angle of rotation, respectively, of the motor at the time of a substantial load. It will be seen that the angular velocity of the motor is appreciably less than in the example of FIG. 1; moreover, the motor misses its step owing to this substantial load (0.35 µNm in this example).

Figure 4A:
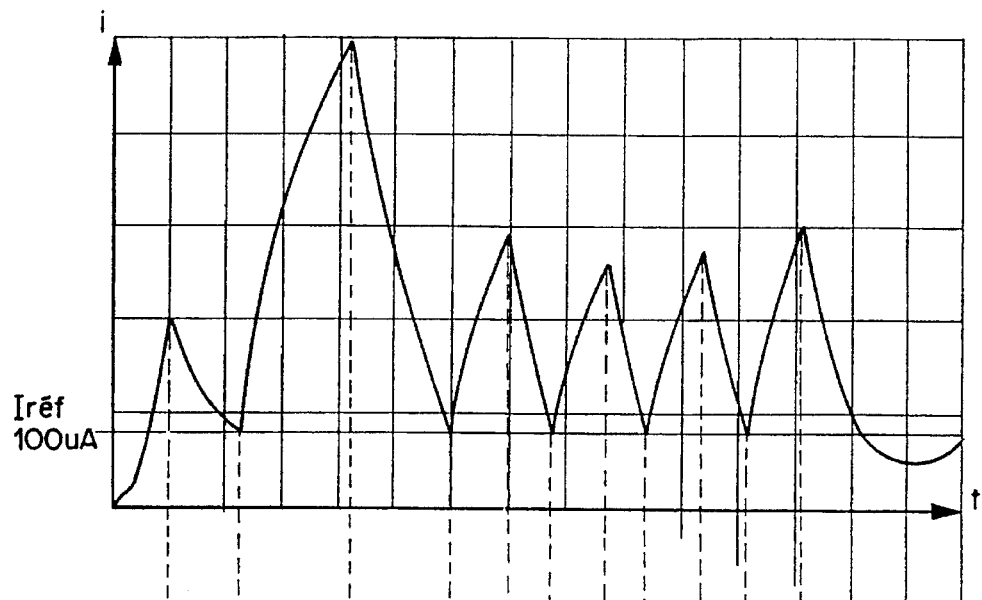
FIGS. 4a to 4b represent enlargements from the first two graphs in FIG. 3.
Figure 4B:
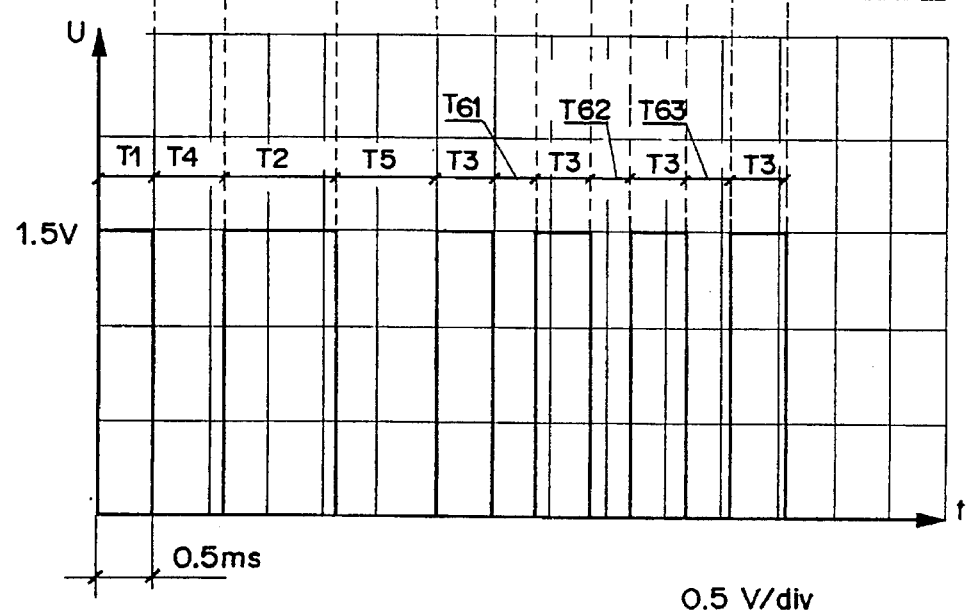

From FIG. 4, it will be seen that there is an increase in durations T4 and T5 as compared with the case shown in FIG. 2. The explanation of this increase in the durations of current decrease is supplied through equations (1) and (2). The main cause of this increase is the reduction of the angular velocity of the motor.

Comparing the values T4 and T5 given in FIGS. 2 and 4, the following results are obtained:

motor idling (FIG. 2)

T4=0.43 ms

T5=0.27 ms

ΔT=T4−T5=0.16 ms motor with extreme load (FIG. 4)

T4=0.61 ms

T5=0.85 ms

ΔT=T4−T5=−0.24 ms

The sign of ΔT is therefore seen to change between idling and running with an extreme load.

Systematic trials with other values for T1 and T2 have shown that the extreme-load condition depends essentially on these durations and very little on the value of Iref. The extreme-load condition may be expressed in the general case as ΔT=k1·T4−k2·T5<0 wherein k1 and k2 are predetermined constants.

Since this condition depends very little on Iref, a value which is difficult to guarantee with great precision in mass production, this method of detection constitutes an important advantage from the point of view of reducing the cost of the integrated circuit.

In FIG. 4, the train of four pulses of duration T3 is shown after the appearance of the extreme-load condition, this being done for the purpose of facilitating the comparison with FIG. 2. In reality, when the extreme-load condition is detected, the feed may be interrupted in order to save on the power consumption of the motor, for the train of four pulses of duration T3 becomes unnecessary.

FIG. 5 shows the current and the voltage of the motor when the polarity of the pulse is different from that of the rotor. In this case, too, the condition obtained is analogous to that of the extreme-load condition, i.e.,

ΔT=T4−T5<0

The case of different polarities may appear when the rotor of the motor misses a step owing to a shock outside the feed pulses.

FIG. 6 shows the reinforcing pulses supplied to the motors when the extreme-load or different-polarity condition is detected. The purpose of these reinforcing pulses is to make up the steps missed as a result of the aforementioned occurrences.

The reinforcing pulses are composed of two high-energy pulses of different polarities, fed at an interval of about 30 ms after the appearance of the extreme-load or different-polarity conditions.

FIG. 7 shows a circuit diagram of a means for carrying out the inventive feeding method. A time-base signal coming from an oscillator Q is sent to a dividing and shaping circuit 70, at the output of which appear a motor-feeding period T0 and durations T1, T2, and T3 of partial pulses; signals T0, T1, T2, and T3, as well as a signal C at the output of a comparator 71, are sent to a logical circuit 72 which supplies varying intervals T4, T5, and T6i. The outputs T4 and T5 of circuit 72 are sent to an extreme-load detection logical circuit 73. A logical circuit 74 receives at its inputs signals T0, T1, T2, T3, T4, T5, and T6i, and the output CE of circuit 73, and supplies control signals D1, D2, D3, and D4 to an output stage (driver) 75. A measuring resistor r is connected in series with a motor M at the output of driver 75, and a converter 76 converts the voltage at the terminals of measuring resistor r into a signal giving the image of the current i of the motor prior to sending it to comparator 71.

FIG. 8 is a detail of element 75 (driver) of the circuit diagram of FIG. 7. Output transistors 81, 82, 83, and 84 are mounted as an H bridge and controlled by signals D1, D2, D3, and D4 from circuit 74.

What is claimed is:

1. A method of driving a single-phase stepping motor for a timepiece with chopped voltage pulses of a duration varying as a function of load conditions and a supply voltage, and with reinforcing pulses succeeding the chopped voltage pulses, the method comprising the steps of:

forming each chopped voltage pulse of a train of partial voltage pulses composed of a pulse of a first duration, a pulse of a second duration, and a train of pulses of a third duration, the pulses of the first, second, and third durations being of the same polarity;

causing first time interval T4, second time interval T5, and third time interval T6 respectively separating the partial voltage pulses to vary as a function of the load conditions and as a function of the supply voltage of the motor;

detecting occurrence of an extreme load condition defined by k1·T4<k2·T5, wherein k1 and k2 are predetermined constants; and supplying the reinforcing pulses to the motor only upon occurrence of said extreme load condition.

2. The method of claim 1, comprising the further steps of:

delimiting the first time interval by the end of the partial pulse of the first duration and the following moment when the current of the coil is equal to or less than a reference current Iref;

delimiting the second time interval by the end of the partial pulse of the second duration and the following moment when the current of the coil is equal to or less than the reference current Iref; and delimiting each third time interval by the end of a partial pulse of the third duration and the following moment when the current of the coil is equal to or less than the reference current Iref.

3. The method of claim 1, comprising the further step of interrupting any chopped pulse if the total number of partial pulses of the first, second, and third durations reaches a predetermined maximum value.

4. The method of claim 1, comprising the further step of interrupting any chopped pulse if one of the third time intervals exceeds the value k3·T4, wherein k3 is a predetermined constant.

5. The method of claim 1, comprising the further step of short-circuiting the coil of the motor between two chopped pulses.

6. The method of claim 1, comprising the further step of modifying the third duration from a first value to a second value between two successive chopped pulses upon occurrence at the time of the first of the two successive chopped pulses of an extreme-load condition defined by k1·T4<k2·T5, wherein k1 and k2 are predetermined constants.

7. The method of claim 1, wherein the reinforcing pulses are of the same polarity as each said chopped pulse.

8. The method of claim 1, wherein the reinforcing pulses are of opposite polarity to each said chopped pulse.

9. A circuit for driving a single-phase stepping motor having an assembly of switches, time-counting means determining main periods succeeding one another at a constant frequency, and control means acting on said switches for supplying the motor during each of said main periods with a chopped pulse formed of a plurality of partial pulses and with reinforcing pulses under extreme load conditions, said control means including one or more sensors capable of determining the duration of said partial pulses, said circuit comprising:

counting means arranged to define constant durations delimiting said partial pulses, a first sensor forming part of said control means and reacting to first, second, and third intervals of time for delimiting the total duration of said chopped pulse, and a second sensor forming part of said control means and reacting to said first and second intervals of time for supplying the motor with said reinforcing pulses under extreme load conditions.

* * * * *